(No Model.)
W. H. LOY & F. H. GRANT.
HEATING STOVE.
No. 543,742. Patented July 30, 1895.
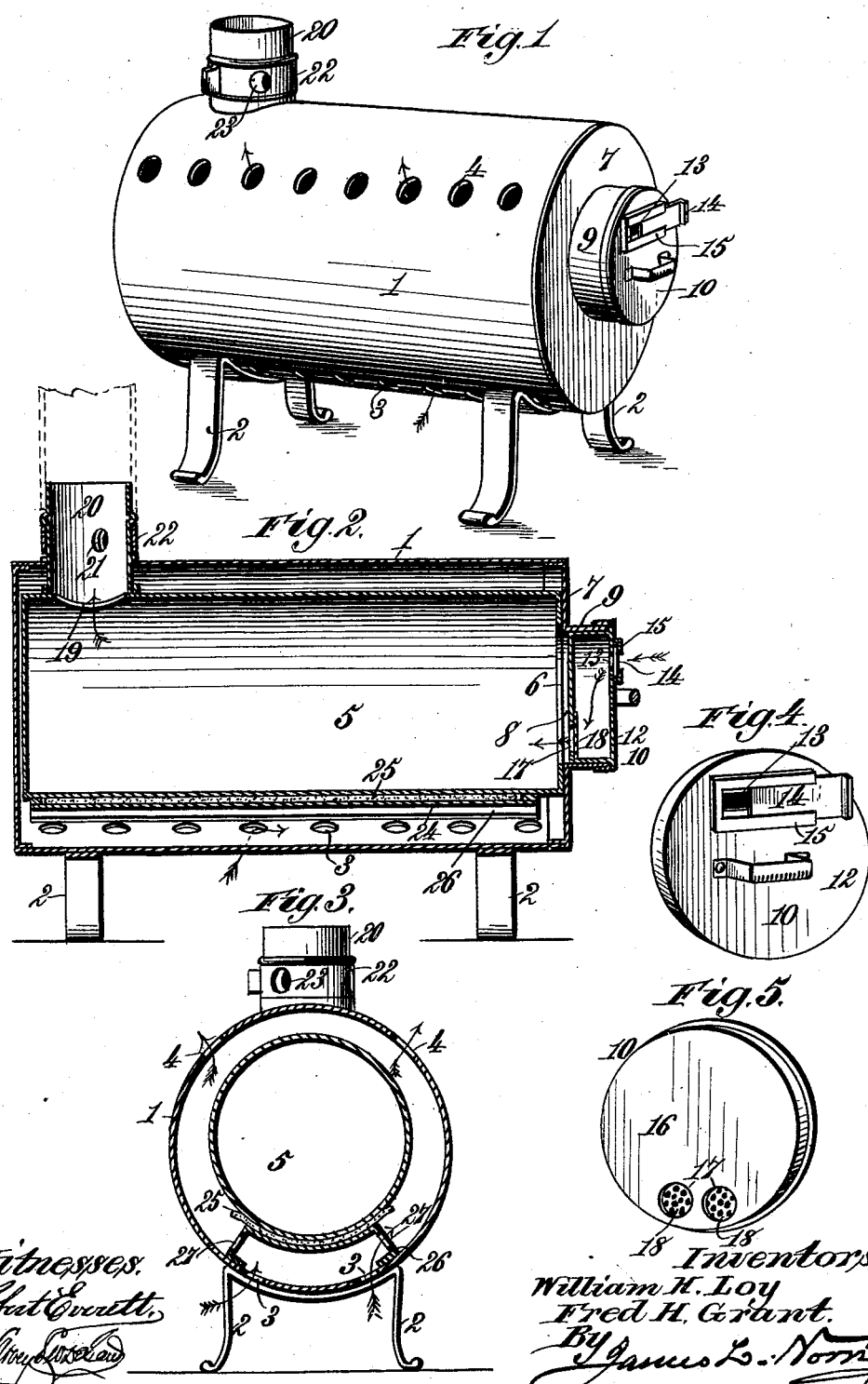
Witnesses.
Inventors.
William H. Loy
Fred H. Grant.
By James L. Norris
Atty.

United States Patent Office.

WILLIAM HENRY LOY AND FRED H. GRANT, OF WHAT CHEER, IOWA.

HEATING-STOVE.

SPECIFICATION forming part of Letters Patent No. 543,742, dated July 30, 1895.

Application filed October 22, 1894. Serial No. 526,600. (No model.)

*To all whom it may concern:*

Be it known that we, WILLIAM HENRY LOY and FRED H. GRANT, citizens of the United States, residing at What Cheer, in the county of Keokuk and State of Iowa, have invented new and useful Improvements in Heating-Stoves, of which the following is a specification.

This invention relates to heating-stoves adapted to consume wood; and has for its object to provide a novel, simple, and efficient construction which is economical and largely increases the heating capacity with a given quantity of fuel.

To accomplish this object the invention consists, essentially, of an external casing having the lower and upper portions of its wall formed with longitudinal rows of air inlet and outlet perforations, a cylindrical fire-chamber located in the said casing and having a door opening in its front end and feet supporting it within the casing to provide a surrounding hot-air space between the casing and fire-chamber, a smoke-pipe leading from the fire-chamber through the casing, and a door closing the door-opening in the front end of the fire-chamber and provided with means for supplying heated air to the fire-chamber to support combustion and create the necessary draft.

The invention consists in an external casing having the lower and upper portions of its wall formed with longitudinal rows of inlet and outlet perforations, a cylindrical fire-chamber located in the said casing and having a door opening in its front end and feet supporting it in the casing to provide a surrounding hot-air space between the casing and fire-chamber, a disk or plate closing one end of the casing and having a cylindrical outwardly-projecting neck and a central orifice, and a hollow door fitting said neck to close the door-opening of the fire-chamber, and provided in its front wall with a valve-controlled cold-air inlet and in its rear wall with a hot-air outlet for delivering heated air into the fire-chamber to support combustion, create the necessary draft, and avoid any tendency to puff smoke out into the room when a brisk fire is started and suddenly checked.

The invention is illustrated by the accompanying drawings, in which—

Figure 1 is a perspective view of a heating-stove constructed in accordance with our invention. Fig. 2 is a longitudinal central sectional view of the same. Fig. 3 is a transverse sectional view. Fig. 4 is a detail perspective view looking at the front of the hollow door which closes the door-opening in the front end of the fire-chamber, and Fig. 5 is a similar view looking at the rear side of the hollow door.

In order to enable those skilled in the art to make and use our invention, we will now describe the same in detail, referring to the drawings, wherein—

The numeral 1 indicates a casing which, as here shown, is in the form of a cylinder, having suitable supporting-feet 2. The casing is preferably constructed of planished iron, but may be made of any other metal suitable for the purpose, and instead of being a true cylinder it may be of any other desired form.

The lower portion of the cylinder is provided with longitudinal rows of air-inlet perforations 3, and the upper portion of the cylinder is provided with longitudinal rows of outlet-perforations 4. The perforations are arranged in longitudinal rows in order to permit a large volume of air to enter and leave the casing throughout its entire length.

In the casing 1 is arranged a fire-chamber, constructed in the form of a cylinder 5, of a length approximately coextensive with the length of the casing. The cylindrical fire-chamber is provided at its front end with a door-opening 6, and the front end of the casing is closed by a disk or plate 7, having at its center an opening 8 and an outwardly-projecting annular neck 9. The opening 8 is coincident with the door-opening 6 of the fire-chamber, and the door-opening 6 is designed to be closed by a hollow circular door 10, having a front wall 12, provided with an air-inlet orifice 13, adapted to be more or less opened through the medium of a suitable valve 14. The valve here illustrated is adapted to slide in guides 15, and by moving it lengthwise the air-inlet orifice 13 is more or less opened, and consequently the volume of air admitted into the hollow door can be regulated. The rear wall 16 of the hollow door is provided with one or more air-outlet orifices 17, preferably covered with perforated plates or wire-gauze 18. The air-outlet orifice or orifices 17 are located at the lower portion of the rear wall 16 of the hollow door, while the air-inlet orifice 13 is located at the upper portion of the front wall 12, so that the air entering the orifice 13 cannot pass in a horizontal plane to the outlet-orifices 17, but must descend thereto, and in this travel of the air it is thoroughly heated and delivered in this condition into the fire-chamber, thereby increasing the heating capacity of the stove and effectually preventing puffing of smoke out of the stove into the room when a brisk fire is suddenly checked.

The rear end of the fire-chamber is provided with an opening 19, communicating with a pipe-collar 20 rising through the casing 1, and adapted to receive a stovepipe. The pipe-collar 20 is provided with a series of perforations 21, adapted to be more or less closed by a ring 22, having perforations 23, which can be made to register with the perforations 21. By this means a very simple check-damper is provided on the pipe-collar to aid in controlling the fire.

In the practical use of the improved stove the cold air enters the longitudinal rows of perforations in the lower portion of the casing 1, and traverses the annular space around the fire-chamber and passes out through the longitudinal rows of perforations in the upper portion of the casing. By this means a circulation is created and volumes of heated air are delivered into the apartment in which the stove is located.

The cylinder constituting the fire-chamber is preferably composed of sheet steel or iron and all the seams are made air-tight. The stove is durable and economical in the consumption of fuel, and the heating capacity is largely increased with a given quantity of fuel.

To avoid overheating the bottom of the stove, particularly when no ashes are in the fire-chamber, and to avoid danger of setting fire to the floor, we provide the lower portion of the cylindrical fire-chamber with an attached curved metallic plate 24, and interpose between the same and the cylindrical fire-chamber a sheet 25 of asbestos or other fireproof material. The plate 24, which serves to retain the asbestos or fireproof-sheet 25 in proper position is constructed along its opposite edges with longitudinal feet or flanges 26, having perforations 27. The feet or flanges serve to center the cylindrical fire-chamber and properly sustain the same within the casing 1, while the perforations in the feet or flanges permit the passage of air around the fire-chamber to the outlet perforations in the upper portion of the casing.

Having thus described our invention, what we claim is—

1. A heating stove, consisting of an external casing having the lower portion of its wall provided with longitudinal rows of inlet openings and the upper portion of its wall formed with longitudinal rows of outlet openings, a cylindrical fire chamber located within said casing and having a door opening in its front end and a smoke flue at its rear end, flanges secured to said fire chamber for supporting it centrally within the casing to provide a surrounding hot air space, a disk or plate at one end of the casing having a central opening, and a door for closing the door opening in the front end of the fire chamber, substantially as described.

2. A heating stove, consisting of an external casing having the lower portion of its wall provided with longitudinal rows of inlet openings and the upper portion of its wall formed with longitudinal rows of outlet openings, a cylindrical fire chamber located within said casing and having a door opening in its front end and a smoke flue at its rear end perforated longitudinal flanges secured to the under side of said fire chamber for supporting it centrally within the casing to provide a surrounding hot air space, a disk or plate at one end of the casing having a central opening, and a door for closing the door opening in the front end of the fire chamber, substantially as described.

3. A heating stove, consisting of an external casing having the lower and upper portions of its wall formed with inlet and outlet perforations, a cylindrical fire-chamber located in the said casing and having a door opening in its front end, a plate arranged at the lower side of the cylindrical fire-chamber and provided with supporting feet or flanges, an asbestos or fire-proof sheet interposed between the fire-chamber and the said plate, and means for closing the front end of the casing and the door-opening of the fire-chamber, substantially as described.

4. A heating stove, consisting of an external casing, a cylindrical fire chamber centrally supported within said casing and provided at its rear end with a smoke flue and having a door opening in its front end, a disk or plate at one end of the casing having a cylindrical neck and a central opening, and a hollow door fitting said neck to close the door opening of the fire chamber and provided in its front wall with a valve controlled cold air inlet and in its rear wall with a hot air outlet for delivering heated air into the fire chamber, substantially as described.

In testimony whereof we have hereunto set our hands in presence of two subscribing witnesses.

WILLIAM HENRY LOY.
FRED H. GRANT.

Witnesses:
ULAND CLARK,
D. P. YODER.